Figure 1:
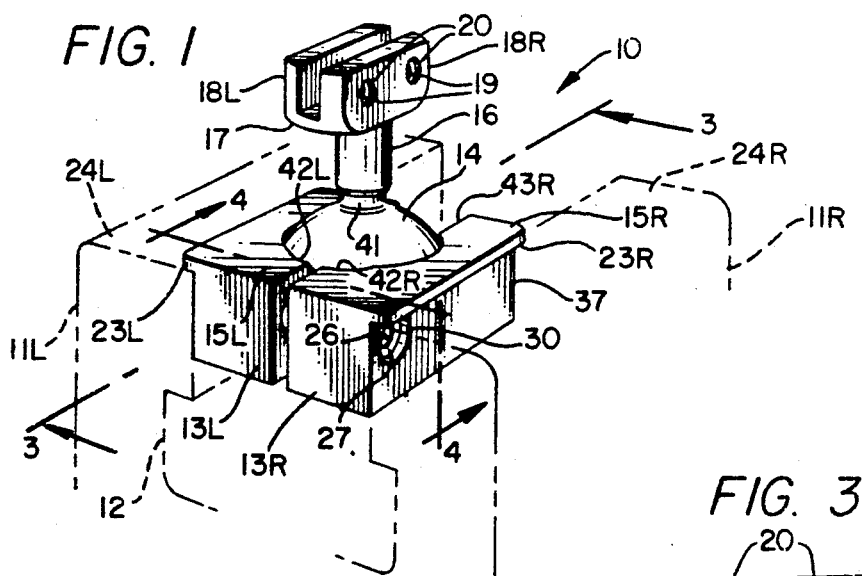

United States Patent [19]

Womack

[11] Patent Number: 5,069,433

[45] Date of Patent: Dec. 3, 1991

[54] ARTICLE MULTIPLE POSITION SWIVEL BALL MOUNT WITH POSITION HOLD CLAMPING

[76] Inventor: Robert C. Womack, 5119 Radbrook Pl., Dallas, Tex. 75220

[21] Appl. No.: 630,008

[22] Filed: Dec. 19, 1990

[51] Int. Cl.$^5$ ................................................ B25B 1/24
[52] U.S. Cl. ........................................ 269/277; 269/75
[58] Field of Search ................... 269/45, 75, 97–98, 269/277, 278; 248/182, 181, 187

[56] References Cited

U.S. PATENT DOCUMENTS

| | | | |
|---|---|---|---|
| 1,379,382 | 5/1921 | Bergstedt | 269/75 |
| 1,672,808 | 6/1928 | Hansel | 269/277 |
| 1,936,968 | 11/1933 | Neal | 269/277 |
| 4,801,131 | 1/1989 | Bagley | 269/75 |
| 4,852,866 | 8/1989 | Kristoff | 269/277 |

*Primary Examiner*—Robert C. Watson

*Attorney, Agent, or Firm*—Warren H. Kintzinger

[57] ABSTRACT

A multiple (infinite positions) position swivel ball mount with the swivel ball position clamp locked between two clampable base members that may be clamped toward each other between the jaws of a vise tightly on the swivel ball. Recesses are provided in each of the two clampable base members so that clamping force is exerted by the base members in opposite annular bands displaced from the opposite side center points of the swivel ball for enhanced positive clamping thereof when the clampable base members are tightened into position clamped engagement with the swivel ball. A projection from the swivel ball has an article mounting and holding fixture outer end and the two clampable base members together have an open channel permitting a greatly extended range of angled positions the swivel ball can be clamped in providing a greatly varied range of article mountings.

7 Claims, 2 Drawing Sheets

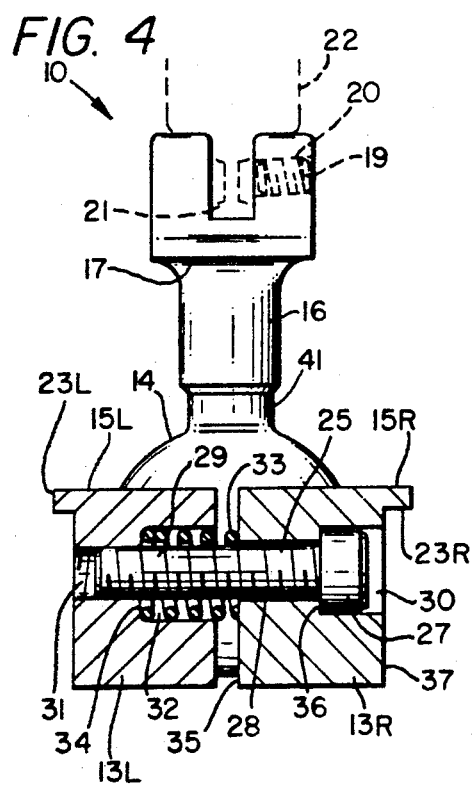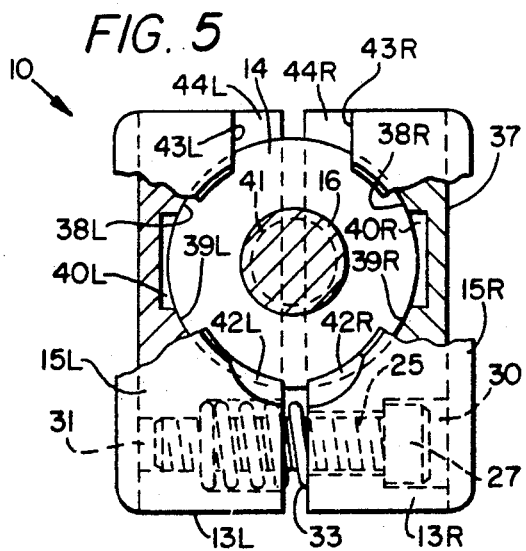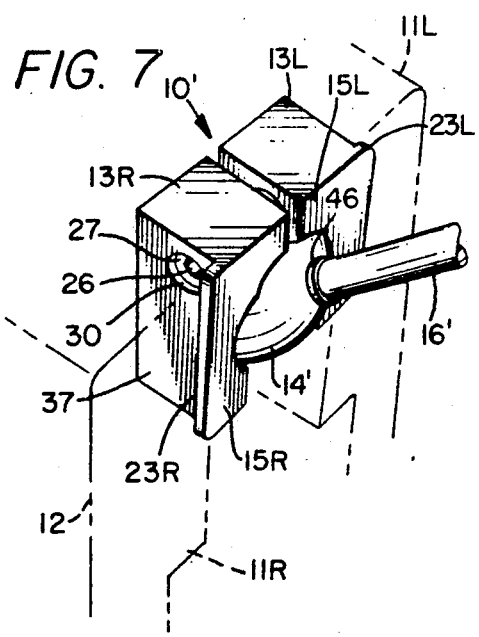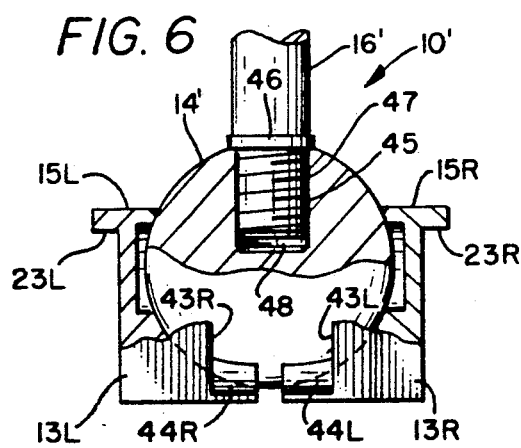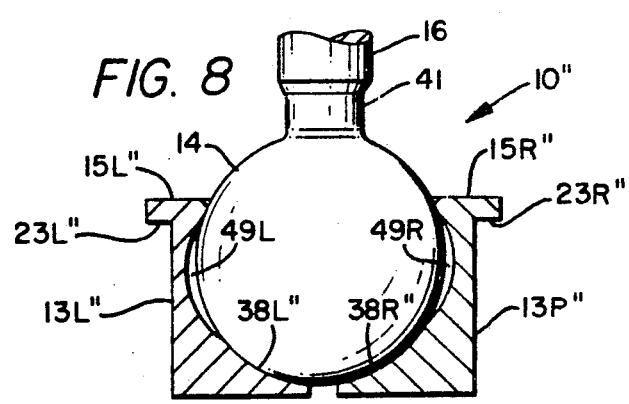

ARTICLE MULTIPLE POSITION SWIVEL BALL MOUNT WITH POSITION HOLD CLAMPING

This invention relates in general to mounting devices for articles to be viewed and be work processed, and more particularly, to an infinite position range swivel ball mount with the swivel ball position clamp locked in a desired position for an article held by the mount unit.

There are many devices and ways of mounting articles for viewing and to be work processed such as vices and other clamping devices and work tables. Most of these devices are limited as to the range of positions an article may be held and many times limit the approaches of article work processing with mount member interference and awkward positions of an article being held for work procedures. Further, some articles while heavy must be securely mounted and not move while being worked.

It is, therefore, a principal object of this invention to provide a versatile infinite position article holder mount that securely clamps a swivel ball of the mount unit from movement.

Another object is to provide article mounting in desired positions reliably through extended periods of time.

A further object is to provide such an article mounting unit that is easy to use throughout its infinite range of position settings.

Still another object is to provide such an article mounting unit that while relatively inexpensive is highly adaptable in use.

Features of the invention useful in accomplishing the above objects include, in an article multiple position swivel ball mount with position hold clamping, an infinite position swivel ball mount with the swivel ball position clamp locked between two clampable base members that may be clamped toward each other between the jaws of a vise tightly on the swivel ball. Recesses are provided in each of the two clampable base members so that clamping force is exerted by the base members in opposite annular bands displace from the opposite side center points of the swivel ball for enhanced positive clamping thereof when the clampable base members are tightened into position clamped engagement with the swivel ball. A projection from the swivel ball has an article mounting and holding fixture outer end and the two clampable base members together have an open channel permitting a greatly extended range of angled positions the swivel ball can be clamped in providing a greatly varied range of article mountings.

Specific embodiments representing what are presently regarded as the best modes of carrying out the invention are illustrated in the accompanying drawings.

Figure 3:
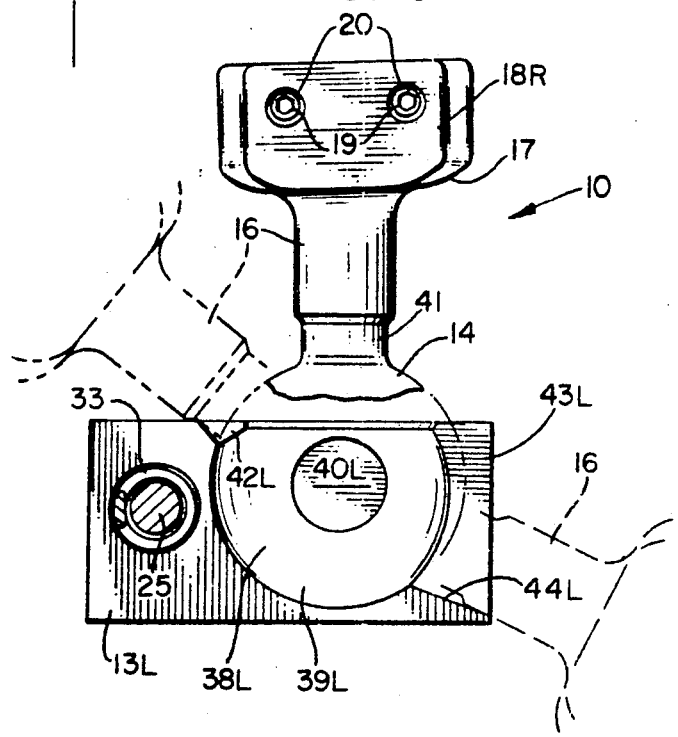
Figure 2:
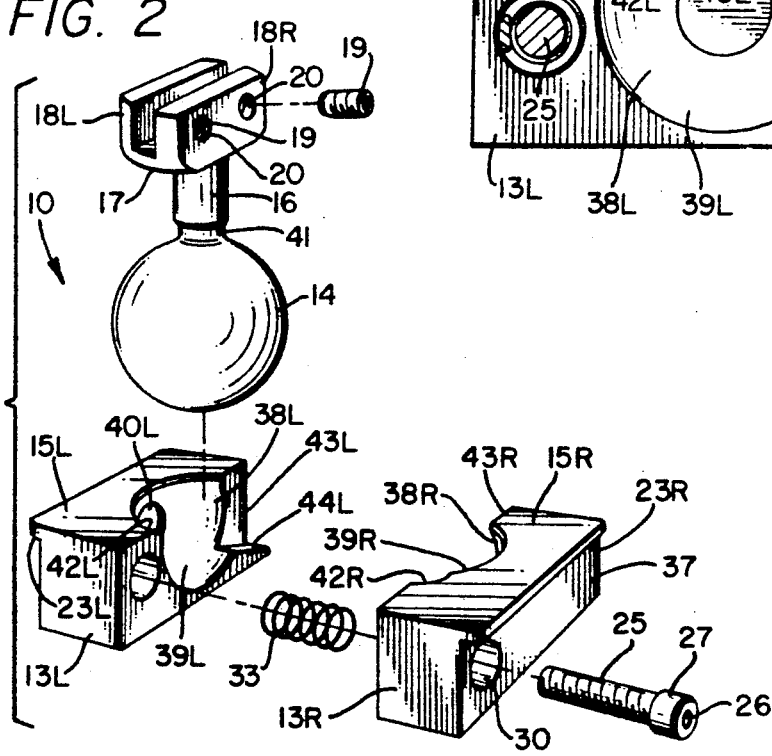

In the drawings:

FIG. 1 represents a perspective view of an article mounting infinite clamped position swivel ball mount unit with a two member clampable base clamped in a vise;

FIG. 2, an exploded perspective view of the article mounting multi-position clamped position swivel ball mount unit of FIG. 1;

FIG. 3, a broken away and sectioned side elevation view taken from line 3—3 of FIG. 1 of the swivel ball mount unit with its extension to an article fixture mount end in vertical orientation and in phantom two transverse limit end positions;

FIG. 4, a broken away and sectioned view taken from line 4—4 of FIG. 1 of the swivel ball mount unit;

FIG. 5, a partially broken away and sectioned top plan view of the swivel ball mount unit;

FIG. 6, a partial broken away and sectioned view of an alternate swivel ball mount unit embodiment;

FIG. 7, a partial perspective view of the swivel ball mount unit of FIG. 6 mounted sidewise in the jaws of a vice (in phantom) as opposed to the topwise mounting of FIG. 1; and, FIG. 8, a partially broken away and sectioned side elevation view of another swivel ball mount unit embodiment from that of FIG. 5, with instead of counter sinks for opposite side ball end clearance the ball clamping openings in the two base clamping mount members have deeper cut openings providing clearance for the swivel ball opposite side ends for enhanced ball clamping against two annular clamp engagement bands on the swivel ball.

Referring to the drawings:

The infinite position article mounting unit 10 of FIGS. 1-5 is shown to be mounted in the clamping jaws 11L and 11R of a vise 12, partially indicated in phantom. The two clampable base members 13L and 13R of mounting unit 10 enclose generally spherical swivel ball 14 an upper portion of which extends upward and outward beyond the upper surfaces 15L and 15R of clampable base members 13L and 13R. An extension projection 16 integrally formed with the generally spherical swivel ball 14 extends to an outer end mounting and holding fixture 17 that is "U" shaped with opposite side walls 18L and 18R with two clamping set screws 19 through threaded openings 20 in fixture side wall 18R for being tightened against the mounting flange 21 of an article 22 such as indicated in phantom in FIG. 4.

Base members 13L and 13R have top outer side shoulder extensions 23L and 23R that extend outward over the top surfaces 24L and 24R of vise clamping jaws 11L and 11R and are generally in supportive registry therewith. A bolt 25 with an allen wrench hole 26 equipped head 27 is used to hold base members 13L and 13R together where base member 13R has a clearance opening 28 through which the threaded shank 29 of bolt 25 passes with clearance and a countersunk opening 30 receiving the bolt head 27 with clearance. The threaded shank 29 of bolt 25 extends through into threaded engagement in internally threaded opening 31 in base member 31. Inner countersunk opening 32 in base member 13L receives resiliently compressed coil spring 33 around the threaded shank 29 of bolt 25 and with the spring 33 compressed between the bottom shoulder 34 of opening 32 and the inner side 35 of base member 13R. This resiliently biases base members 13L and 13R apart as limited by bolt head 27 engagement with shoulder 36 in countersunk opening 30. Please note that there is sufficient clearance between the outer end of bolt head 27 and the outer side surface 37 of base member 13L that the bolt head does not interfere with vice jaw clamping of base members 13L and 13R.

The clamping base members 13L and 13R have mirror image partially spherical surfaced 38L and 38R openings 39L and 39R with opposite side end countersunk openings 40L and 40R. This provides for opposite side end clearance of the spherical surface swivel ball 14 and substantially improved position clamping thereof by the generally annular spherical clamping areas of opening surfaces 38L and 38R.

The extension projection 16 from spherical swivel ball 14 has a reduced diameter portion 41 immediately adjacent to the ball 14 to expand the range of swivel positioning thereof toward the back of the clamping base members 13L and 13R particularly with the rounded cut outs 42L and 42R providing more positioning movement room thereby for the projection 16 and the swivel ball 14. In addition the clamping base members 13L and 13R are provided with forward end inner cut opening sections 43L and 43R with slanted bottoms 44L and 44R together forming an opening extending down to the slanted bottoms 44L and 44R accommodating a significant addition increase in the range of clampable settings of the swivel ball 14 with its extension projection 16.

The infinite position article mounting unit 10' of FIGS. 6 and 7 is the same in most respects as the unit 10 of FIGS. 1–5 with, however, the extension projection 16' having a bottom threaded end 45 from shoulder 46 and down that is threaded into internally threaded 47 opening 48 in the spherical ball 14'. Everything else is the same as with the embodiment of FIGS. 1–5 without explanation therefore being again repeated as a matter of convenience.

With reference to the infinite position article mounting unit 10– embodiment of FIG. 8 substantially the only difference from the embodiment of FIGS. 1–5 is that spacing relief is provided in place of countersunk openings 40L and 40R in the clampable base members 13L and 13R in FIGS. 1–5. The two base clamping members 13L" and 13R" have deeper cut opening extensions 49L and 49R from the otherwise spherical shaped annular areas 38L" and 38R" in openings 39L" and 39R". Since everything else is substantially the same as with the embodiment of FIGS. 1–5 that explanation is not repeated again as a matter of convenience.

Please note that alternate article fastening fixtures may be provided in place of the article mounting and holder fixture 17 on the extension projection 16 in many different configurations for different articles as may be appropriate without material alteration of the infinite position article mounting units 10, 10' and 10" described. The swivel ball and two clampable base members are generally made of materials that when clamped together grip each other such as metal against like metal and even non lubricating plastics.

Whereas this invention has been described with respect to several embodiment thereof, it should be realized that various changes may be made without departure from the essential contributions to the art made by the teachings hereof.

I claim:

1. An infinite position swivel ball mount for articles held thereby comprising: a generally spherical ball with an article mounting extension from the swivel ball; two clampable base members having mirror image recess openings facing each other and together holder said swivel ball; said mirror image recess openings in said two clampable base members having spherical surface areas matching the spherical surface of said swivel ball and opening extension recess means extending beyond the spherical surface of said swivel ball providing clearance in said base members at and around opposite side center areas of said swivel ball for enhanced positive clamping of said spherical surface areas of said base member mirror image recess openings on said spherical swivel ball; wherein said spherical surface areas of said base member recess openings are annular areas around said opening extension recess in each of said base members; said two clampable base members each have outer flat surfaces positioned for engagement by jaws of a vise used to clamp hold the two clampable base members of the infinite position swivel ball mount; and wherein said two clampable base members are held together by a single bolt with the bolt head recessed within a countersunk opening of a first base member and the bolt shank extended through a clearance opening to threaded engagement in an internally threaded opening in the second of said base members.

2. The infinite position swivel ball mount of claim 1, wherein top outer side shoulder extensions are provided that extend outward beyond said outer flat surfaces, to extend over the top of vise clamping jaws used to clamp said outer flat surfaces, and to be in supportive registry with the top surfaces of vise clamping jaws; and wherein said article mounting extension from the swivel ball has an article mounting fixture outer end; and wherein said two clampable base members together have an open top permitting an infinite range of settings for said article mounting extension; and wherein said two clampable base members together have an open channel permitting a greatly extended range of angled positions the swivel ball can be clamped in beyond the range of settings permitted by said open top.

3. The infinite position swivel ball mount of claim 2, wherein said two clampable base members together have rounded cut outs toward the rear of the clampable base members from said open channel providing more position movement room for said article mounting extension.

4. The infinite position swivel ball mount of claim 1, wherein a resiliently compressed coil spring is seated in an inner countersunk opening in said second base member and presses against the inner side of said first base member; and wherein said resiliently compressed coil spring is around the threaded shank of said bolt that is an allen head bolt.

5. The infinite position swivel ball mount of claim 4 wherein said clearance in said base members at and around opposite side center areas of said swivel ball are countersunk openings.

6. The infinite position swivel ball mount of claim 4 wherein said clearance in said base members at and around opposite side center areas of said swivel ball are countersunk openings.

7. The infinite position swivel ball mount of claim 2 wherein said article mounting extension is threaded into an internally threaded opening in said swivel ball.

* * * * *